(12) United States Patent
Fitzpatrick

(10) Patent No.: US 8,490,638 B2
(45) Date of Patent: Jul. 23, 2013

(54) RETROFIT VALVE ASSEMBLY KIT FOR FROST-RESISTANT HYDRANT

(75) Inventor: Patrick Fitzpatrick, Grand Rapids, MI (US)

(73) Assignee: Amerikam, Inc., Grand Rapids, MI (US)

( * ) Notice: Subject to any disclaimer, the term of this patent is extended or adjusted under 35 U.S.C. 154(b) by 171 days.

(21) Appl. No.: 13/194,106

(22) Filed: Jul. 29, 2011

(65) Prior Publication Data

US 2011/0283503 A1    Nov. 24, 2011

Related U.S. Application Data

(63) Continuation of application No. 12/194,790, filed on Aug. 20, 2008, now Pat. No. 7,992,585.

(60) Provisional application No. 60/968,323, filed on Aug. 28, 2007.

(51) Int. Cl.
*F16K 43/00* (2006.01)
*E03B 7/10* (2006.01)

(52) U.S. Cl.
USPC ........ 137/15.02; 137/271; 137/301; 137/360; 137/315.17; 285/12

(58) Field of Classification Search
USPC ................. 137/15.02, 271, 301, 360, 315.17, 137/315.27, 269
See application file for complete search history.

(56) References Cited

U.S. PATENT DOCUMENTS

| | | | |
|---|---|---|---|
| 5,060,689 A | 10/1991 | Csaszar et al. | |
| 5,392,805 A | 2/1995 | Chrysler | |
| 6,206,028 B1 | 3/2001 | Holden et al. | |
| 6,805,154 B1 | 10/2004 | Dickey et al. | |
| 6,883,534 B2 | 4/2005 | Ball et al. | |
| 6,932,104 B2 | 8/2005 | Anderson et al. | |
| 7,168,450 B2 * | 1/2007 | Dulin | 137/360 |
| 7,607,453 B2 | 10/2009 | Poskin et al. | |
| 2012/0241019 A1 * | 9/2012 | Ball et al. | 137/294 |

* cited by examiner

*Primary Examiner* — Kevin Lee
(74) *Attorney, Agent, or Firm* — McGarry Bair PC

(57) ABSTRACT

A retrofit valve assembly for a frost-resistant hydrant comprises a replacement valve assembly and stem sufficiently long enough to enable the replacement stem to be cut and readily retrofit to existing frost-resistant hydrants of different lengths.

11 Claims, 16 Drawing Sheets

RETROFIT VALVE ASSEMBLY KIT FOR FROST-RESISTANT HYDRANT

CROSS-REFERENCE TO RELATED APPLICATION(S)

This application is a continuation of U.S. patent application Ser. No. 12/194,790, filed Aug. 20, 2008, now U.S. Pat. No. 7,992,585, and claims the benefit of U.S. Provisional Patent Application No. 60/968,323, filed Aug. 28, 2007, which is incorporated herein by reference in its entirety.

BACKGROUND OF THE INVENTION

The invention relates generally to fluid valves and, more particularly, to a valve assembly for a frost-resistant water supply hydrant.

Frost resistant sill cocks or hydrants are known. A frost-resistant sill cock or hydrant typically includes an elongated tubular body with a valve mechanism at a first end and a spout and valve operator at a second, opposed end. The elongated body enables the valve mechanism to be positioned in a relatively warm environment, such as inside a building or underground, while the spout and valve operator are positioned in an environment where freezing temperatures are likely to occur, commonly the exterior of the building. The valve typically comprises a valve seat and plunger which is selectively brought into contact by the valve operator to close off the water supply, and separated to open the water supply to deliver water to the hydrant. Over time, the valve seat and/or plunger can become worn, thus requiring replacement.

The valve seat and plunger are frequently fabricated of brass, and typically include rubber washers or O-rings to provide a suitable seal when in the closed position. Particularly after a period of use, the brass and rubber can become worn or deteriorated, thereby leading to undesirable leakage.

It is known to use ceramic valve assemblies comprising a pair of ceramic plates which rotate relative to each other between an on position and an off position to control the flow of water through the valve. Ceramic valve assemblies have the advantage of resistance to deterioration, long life, and consistent flow control.

It would be advantageous to provide a ceramic valve assembly that can be readily retrofit to existing frost-resistant hydrants produced by different manufacturers.

SUMMARY OF THE INVENTION

A retrofit kit for assembly to a frost resistant hydrant of the type connected to a water supply fixture and comprising a spout assembly, a body tube, a valve assembly, and a stem of an appropriate length extending between the spout assembly and the valve assembly within the body tube to actuate the valve assembly. The retrofit kit includes a valve assembly and a stem having a length greater than the appropriate length. The valve assembly is configured to couple to a hydrant adapter or to a specific water supply fixture. The stem can be cut to the appropriate length for operably coupling the valve assembly to the spout assembly within the body tube so that the retrofit kit can be adapted to existing body tubes of different appropriate lengths to complete a retrofitted frost resistant hydrant regardless of the appropriate length.

The valve assembly provided in the retrofit kit can comprise a ceramic valve cartridge and the stem can include a drive tube. The hydrant adapter, if needed, can include externally or internally threaded, or press fit connections to the water supply fixture.

Another aspect of the invention is a method of replacing the valve assembly. The method comprises the steps of removing the spout assembly, the stem, and the valve assembly from the body tube; providing a retrofit kit comprising a replacement valve assembly and a replacement stem having a length greater than the appropriate length; cutting the replacement stem to the appropriate length; inserting the replacement valve assembly and replacement stem into the body tube; coupling the replacement valve assembly to one of a hydrant adapter and an existing water supply fixture; coupling the replacement stem to the spout assembly; and reconnecting the spout assembly to the body tube.

In the method, the replacement stem can be a drive tube. Also, the appropriate length can be measured on the replacement stem while the replacement valve assembly and replacement stem are in the body tube. Preferably, the appropriate length is determined to be ½ inch beyond the end of the body tube.

DESCRIPTION OF AN EMBODIMENT OF THE INVENTION

Figure 1:
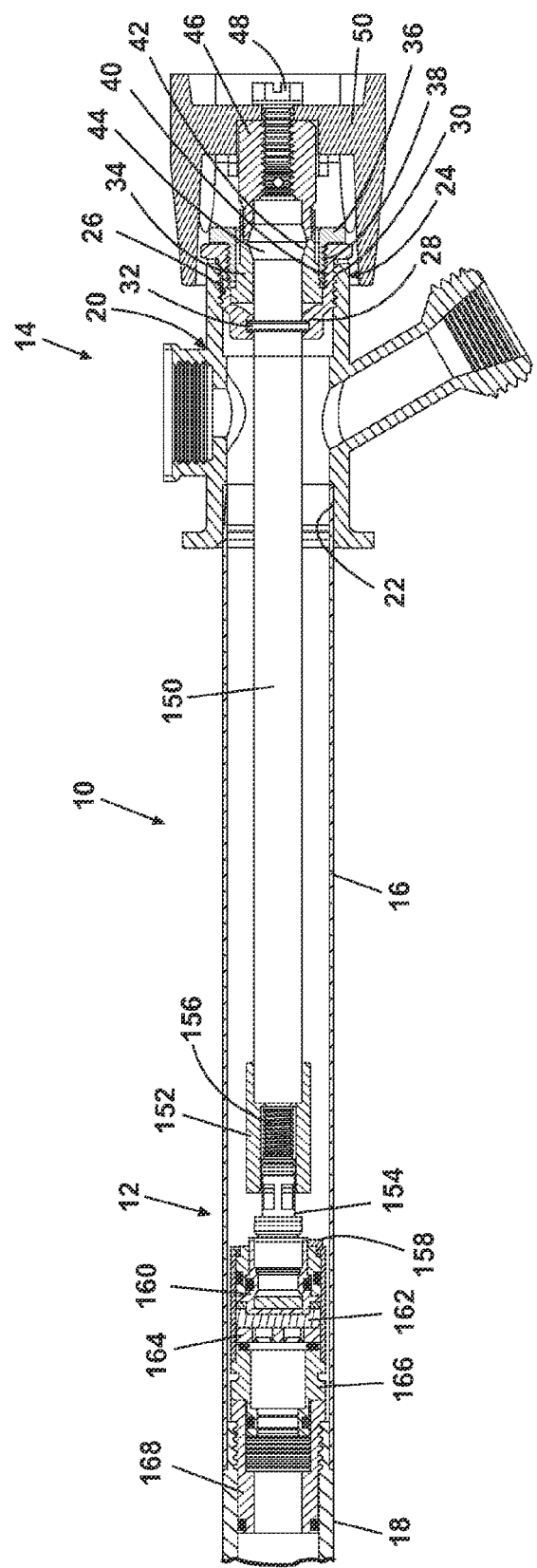
FIG. 1 is a sectional view of an embodiment of the invention comprising a retrofit valve assembly for a frost-free hydrant comprising a valve assembly and a spout assembly.

Referring to the drawings and particularly to FIG. 1, an embodiment of the invention is illustrated comprising a frost-resistant hydrant 10 comprising a valve assembly 12 coupled with a spout assembly 14 through a body tube 16 fluidly coupled to a known water supply fixture 18. FIG. 1 is a sectional view of the hydrant 10 taken along a longitudinal plane for clarity in illustrating the various elements of the assembly. The hydrant 10 is bilaterally symmetrical about the longitudinal plane. FIGS. 2-19 also illustrate various bilaterally symmetrical elements comprising the hydrant 10 taken along the longitudinal plane, except where otherwise indicated.

Figure 2:
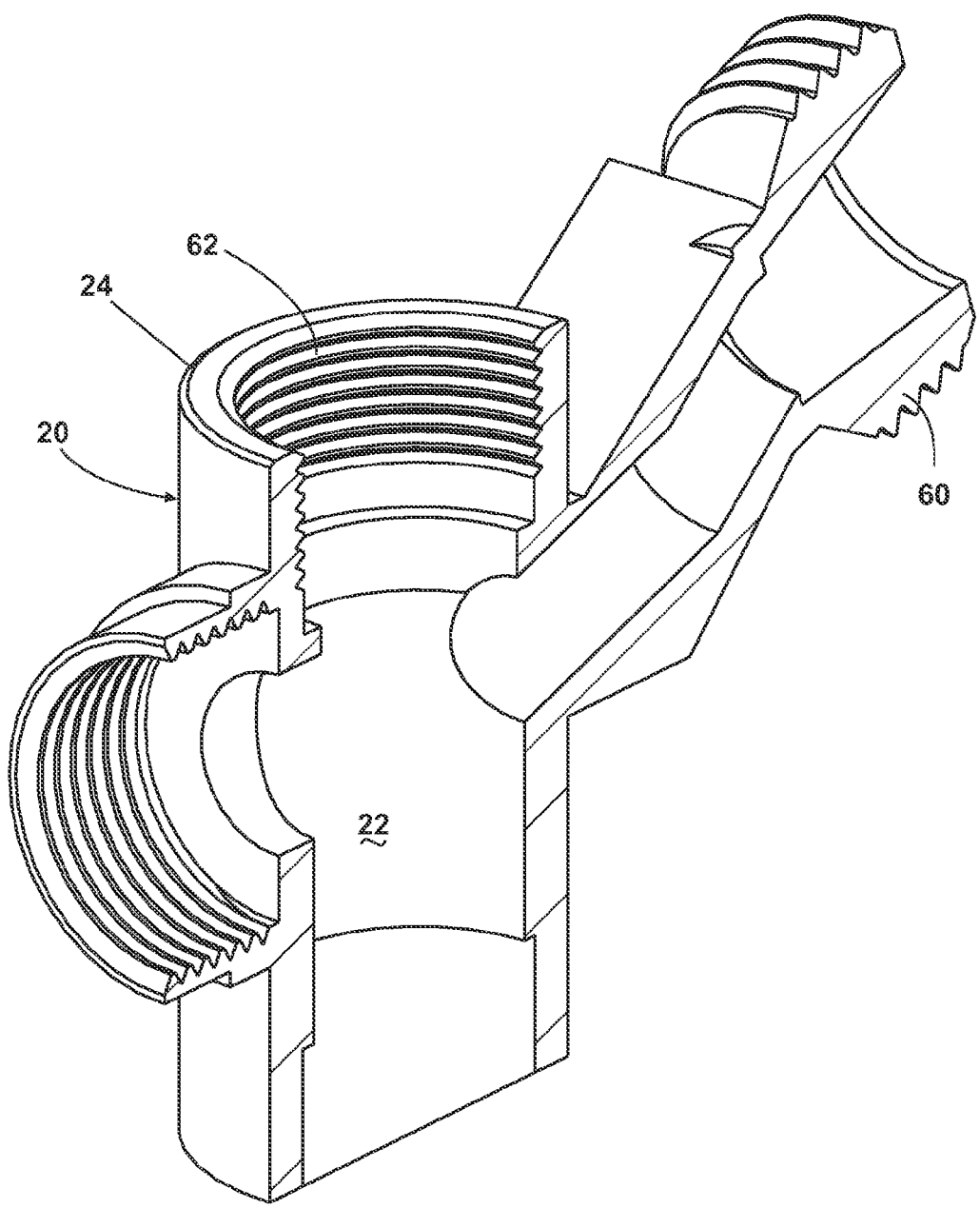
FIG. 2 is a sectional view of a faucet body comprising a portion of the spout assembly illustrated in FIG. 1.

The spout assembly 14 comprises a faucet body 20, a stem seal 28, a drive tube stop 34, a lock nut 36, a ferrule 44, a ferrule nut 46, a generally known knob 50, and a generally known knob screw 48. Referring to FIG. 2, the faucet body 20 is a hollow, bilaterally symmetrical body having a proximal end 24 terminating in an opening having internal threads 62 for a purpose described hereinafter. The faucet body 20 has a faucet bore 22 extending therethrough, fluidly coupled with an outlet 60 adapted for threadable attachment of a hose, such as a garden hose.

Figure 3:
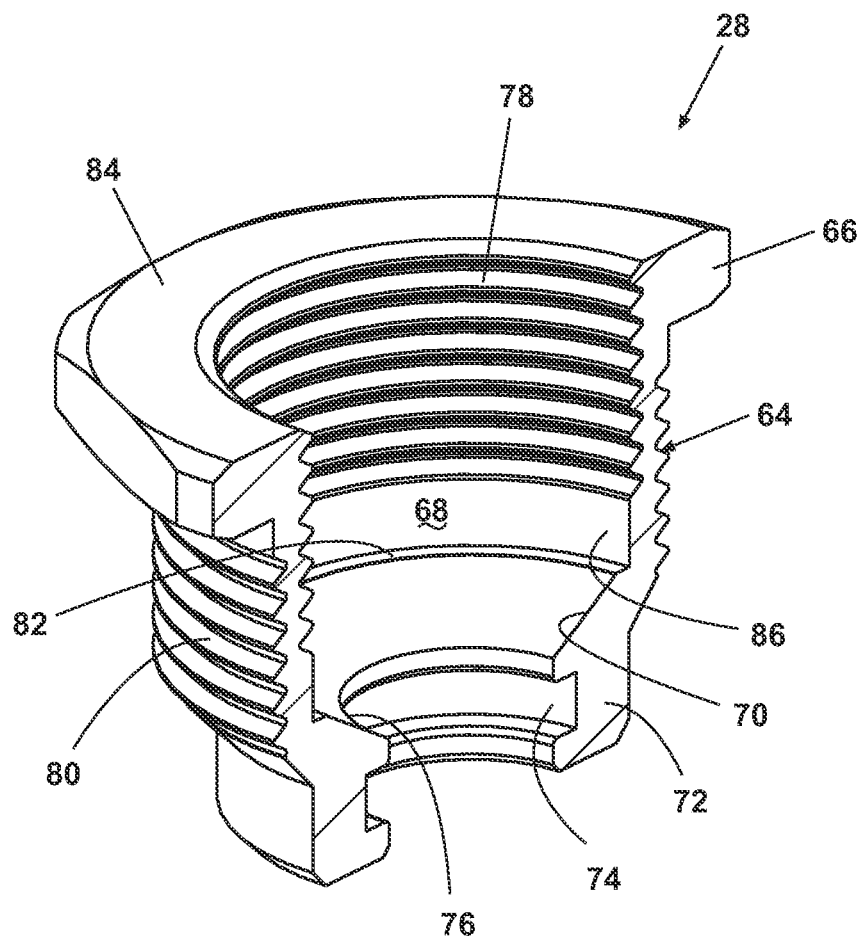
FIG. 3 is a sectional view of a stem seal comprising a portion of the spout assembly illustrated in FIG. 1.

FIG. 3 illustrates the stem seal 28. The stem seal 28 is a bilaterally symmetrical hollow body comprising an annular wall 64 terminating at one end in a radially-outwardly extending flange 66 and at an opposed end in a collar 72. The flange 66 defines an annular, planar flange surface 84 circumscribing the bore 68. The flange 66 is provided with outwardly-oriented planar faces in an octagonal or hexagonal configuration for threadable insertion of the stem seal 28 in the faucet bore 22 with a wrench, as hereinafter described. The annular wall 64 defines a bore 68 extending coaxially through the stem seal 28. The annular wall 64 transitions to a radially-inwardly extending beveled wall 70. The beveled wall 70 defines an opening 76 through the collar 72. The collar 72 is provided with a circumferential O-ring channel 74 circumscribing the opening 76 and adapted for seating of a suitably sized O-ring therein.

Extending longitudinally along the interior of the annular wall 64 from the flange 66 toward the beveled wall 70 are internal threads 78, transitioning to a circumferential intermediate wall 86. The intermediate wall 86 transitions to the beveled wall 70 through a radially-inwardly extending annular internal stop 82. Extending along the outside of the annular wall 64 intermediate the flange 66 and the collar 72 are external threads 80.

Figure 4:
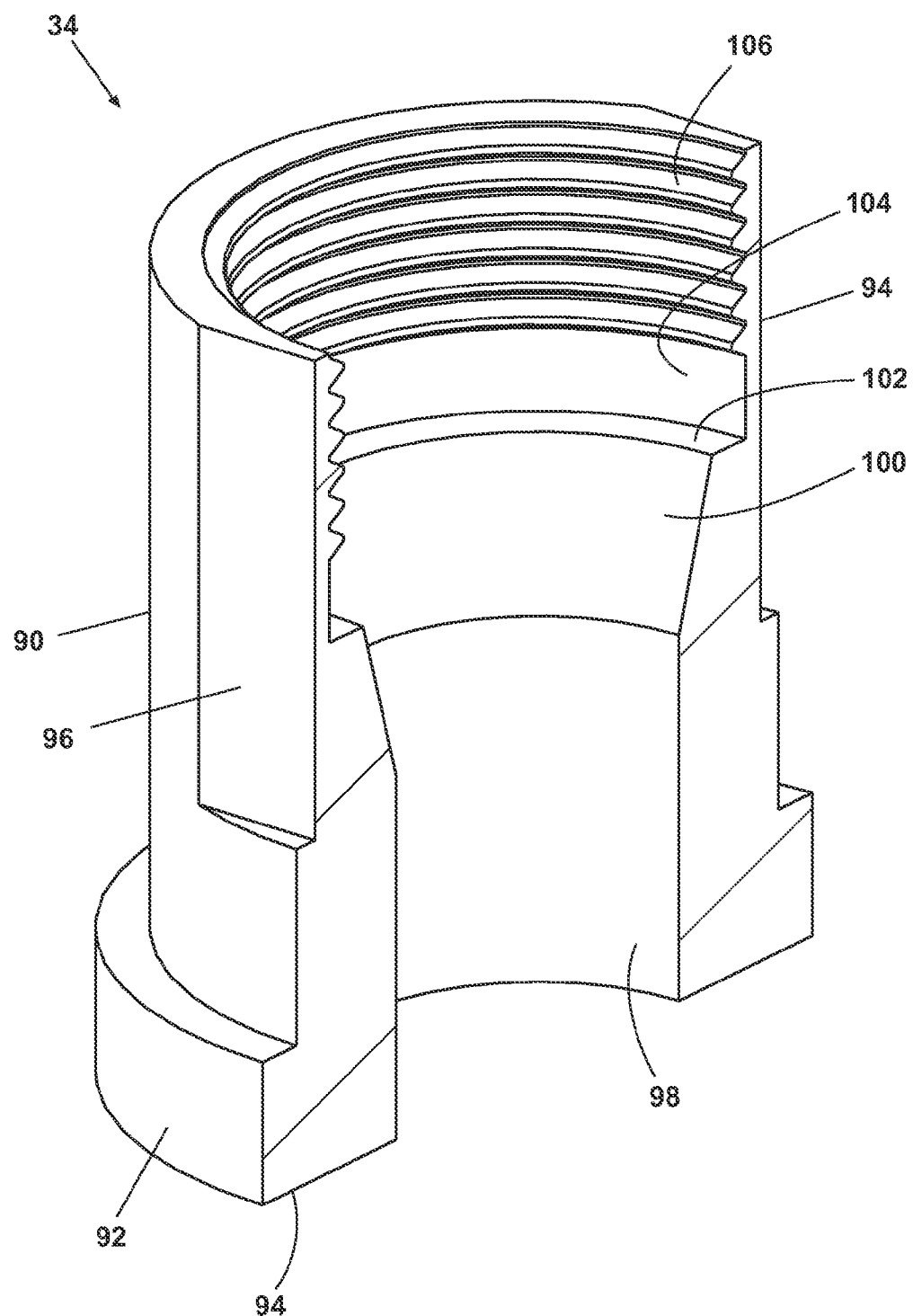
FIG. 4 is a sectional view of a drive tube stop comprising a portion of the spout assembly illustrated in FIG. 1.

FIG. 4 illustrates the drive tube stop 34. The drive tube stop 34 is a bilaterally symmetrical hollow body comprising an annular wall 90 terminating at one end in a radially-outwardly extending flange 92 having a planar annular flange surface 94. The annular wall 90 is provided with a pair of diametrically-opposed, longitudinally-extending parallel planar faces 96. The annular wall 90 defines a bore 98 extending coaxially through the drive tube stop 34. Extending longitudinally along the interior of the annular wall 90 are internal threads 106 transitioning to a circumferential proximal wall 104. The proximal wall 104 transitions through a radially-inwardly extending annular stop 102 to a beveled wall 100 that circumscribes the bore 98 at approximately the mid-section of the drive tube stop 34.

Figure 5:
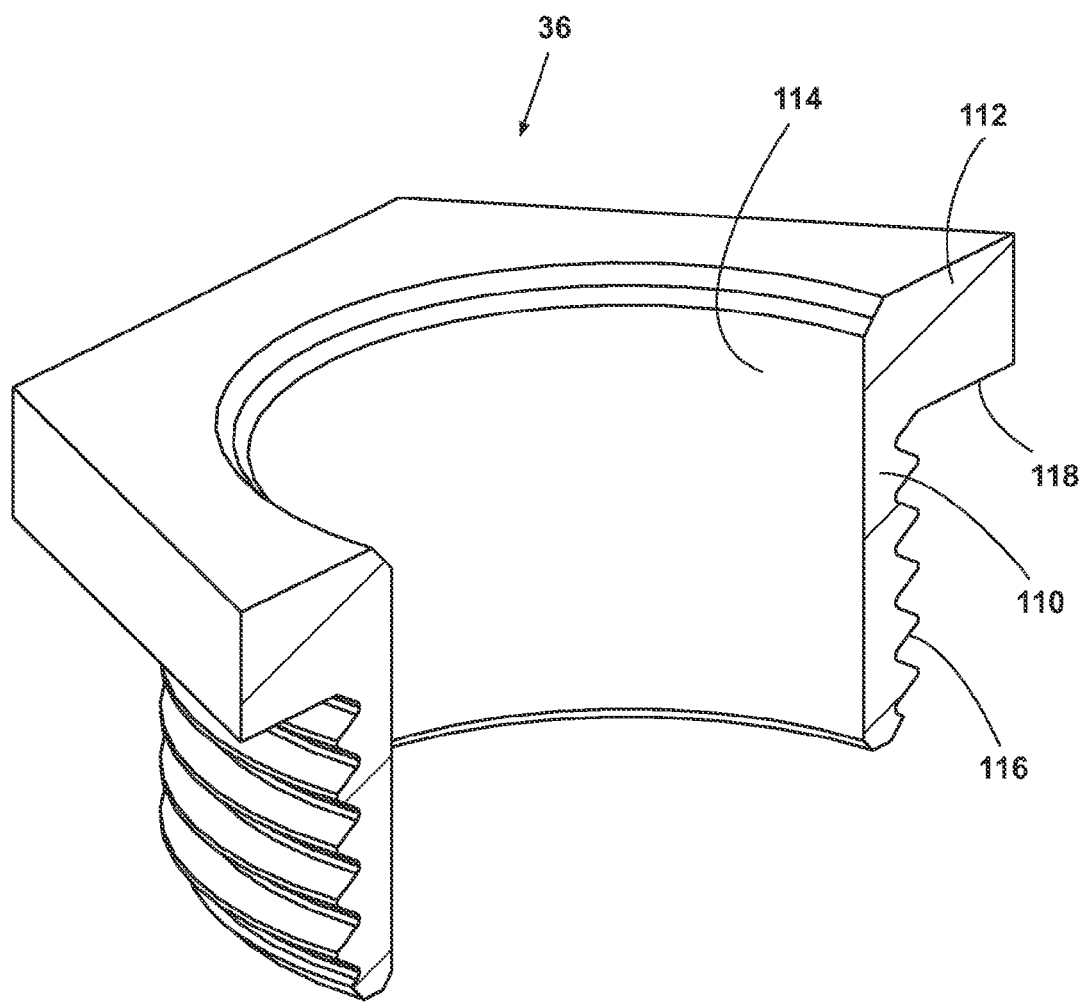
FIG. 5 is a sectional view of a lock nut comprising a portion of the spout assembly illustrated in FIG. 1.

Referring to FIG. 5, the lock nut 36 is a bilaterally symmetrical hollow body comprising an annular wall 110 transitioning at one end to a radially-outwardly extending flange 112. The annular wall 110 defines a bore 114 extending coaxially through the lock nut 36. The flange 112 defines an annular, planar flange stop 118 circumscribing the annular wall 110 along an underside of the flange 112. Extending longitudinally along the exterior of the annular wall 110 are external threads 116.

Figure 6:
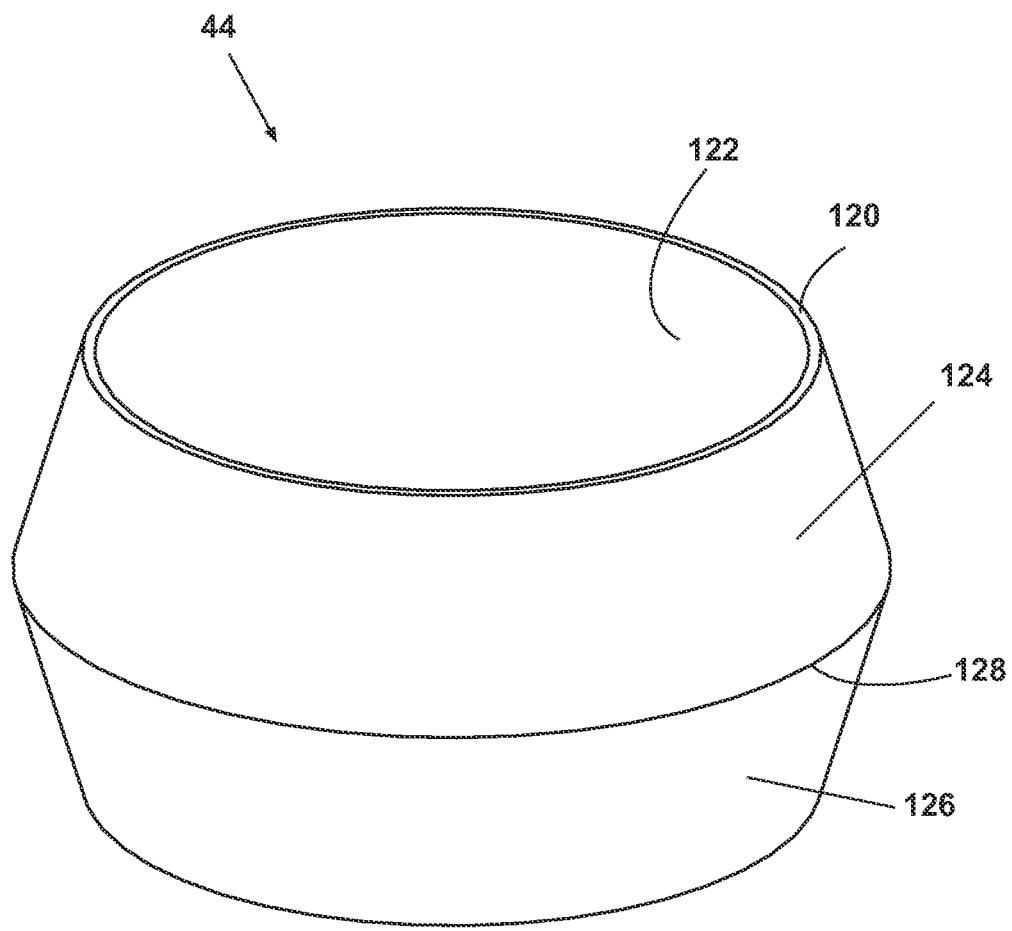
FIG. 6 is a perspective view of a ferrule comprising a portion of the spout assembly illustrated in FIG. 1.

FIG. 6 illustrates the ferrule 44 comprising a generally known, hollow ring-like body comprising an annular wall 120 defining a coaxial bore 122. The annular wall 120 comprises a first beveled wall 124 transitioning to a second beveled wall 126 through a circumscribing crest 128.

Figure 7:
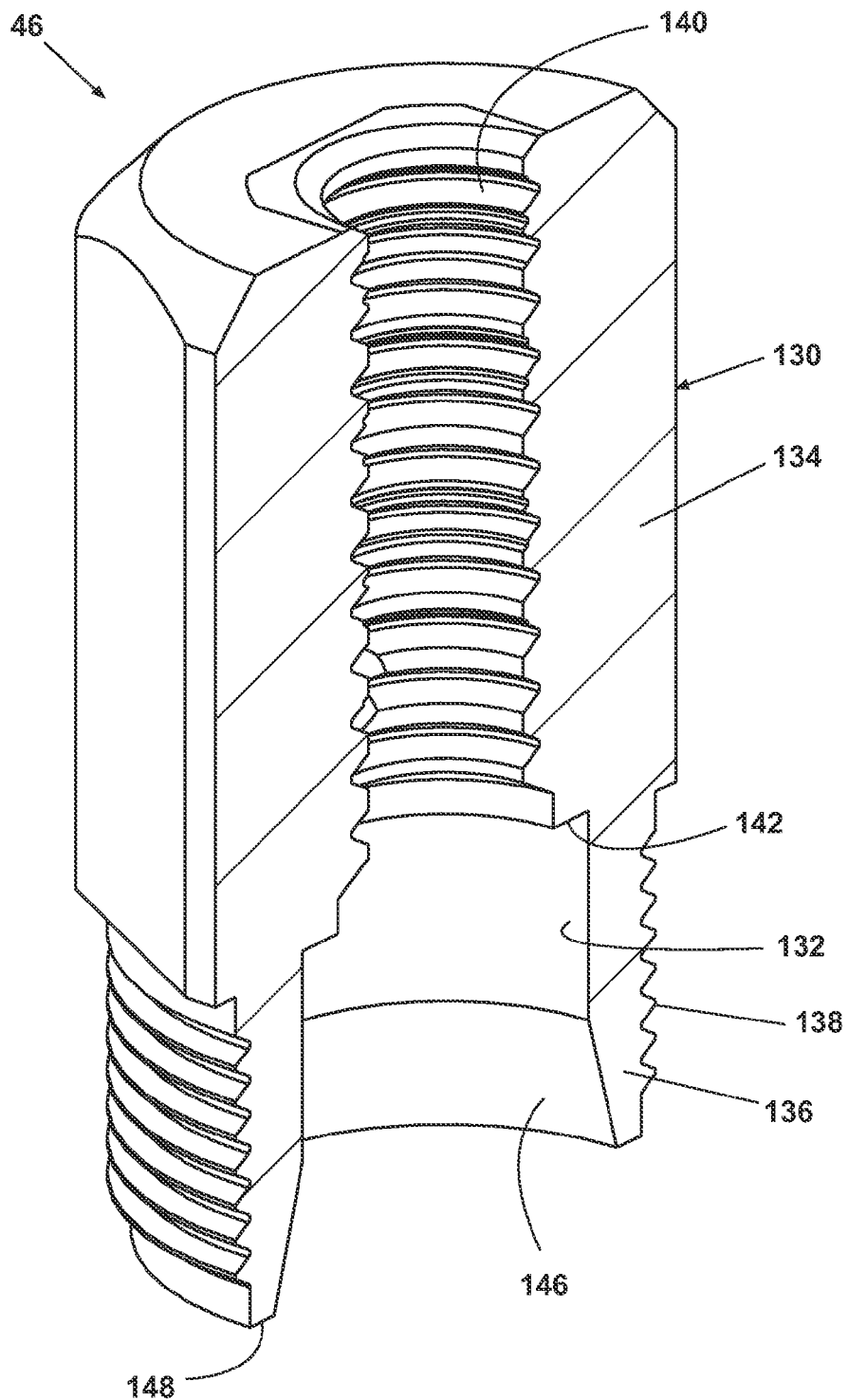
FIG. 7 is a sectional view of a ferrule nut comprising a portion of the spout assembly illustrated in FIG. 1.

Referring to FIG. 7, the ferrule nut 46 is a bilaterally symmetrical hollow body comprising an annular wall 130 defining a bore 132 extending coaxially through the ferrule nut 46. The annular wall 130 comprises a proximal wall 134 having internal coaxial threads 140, transitioning into a ferrule wall 136 through a planar, annular stop shoulder 142. Extending longitudinally along the exterior of the ferrule wall 136 are external threads 138. The ferrule wall 136 transitions to a radially-outwardly sloping beveled wall 146, which terminates in a planar, annular stop surface 148.

The internal threads 62 of the faucet body 20 and the external threads 80 of the stem seal 28 are adapted for threadable coupling of the stem seal 28 with the faucet body 20. The internal threads 78 of the stem seal 28 and the external threads 116 of the lock nut 36 are adapted for threadable coupling of the lock nut 36 with the stem seal 28. The internal threads 106 of the drive tube stop 34 and the external threads 138 of the ferrule nut 46 are adapted for threadable coupling of the ferrule nut 46 with the drive tube stop 34.

Referring again to FIG. 1, the valve assembly 12 comprises a rotation stem 152, a plunger 154, a spring 156 (preferably stainless steel), a cartridge body 158, a driver 160, a rotating ceramic disk 162, a stationary ceramic disk 164, a drive adapter 166, and a hydrant adapter 168. The valve assembly 12 is operably coupled to the spout assembly 14 through a drive tube 150 as hereinafter described. Several of the elements of the valve assembly 12, such as the rotation stem 152, driver 160, rotating ceramic disk 162, and stationary ceramic disk 164, are as generally described in U.S. Pat. No. 5,392,805, commonly owned by Applicants' assignee, which is incorporated as though set forth fully herein.

Figure 8A:
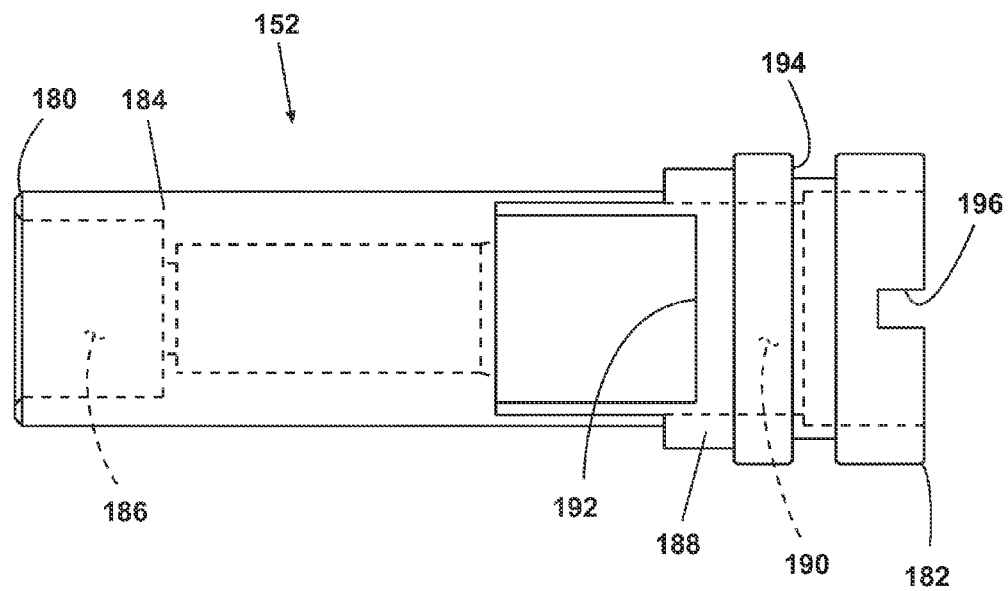
FIG. 8A is a plan view of a rotation stem comprising a portion of the valve assembly illustrated in FIG. 1.
Figure 8B:
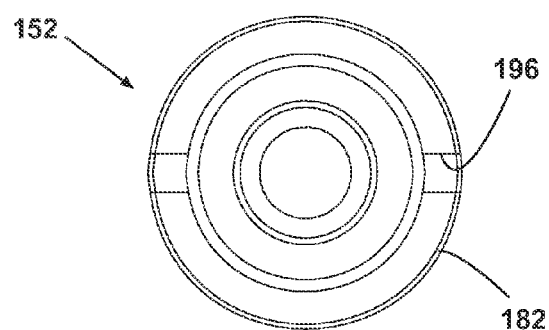
FIG. 8B is an end view of the rotation stem illustrated in FIG. 8A.

Referring now to FIGS. 8A and 8B, the rotation stem 152 is an elongated, somewhat cylindrical, bilaterally symmetrical body comprising a proximal end 180 and a distal end 182. The proximal end 180 comprises a first annular wall portion 184 defining a coaxial tube chamber 186 opening away from the proximal end 180. The distal end 182 comprises a second annular wall portion 188 defining a plunger chamber 190 opening away from the distal end 182. A pair of generally rectilinear, diametrically-opposed flow windows 192 penetrates the annular wall 188 for fluid communication with the plunger chamber 190. An O-ring channel 194 circumscribes the annular wall 188 adjacent the distal end 182. A pair of diametrically-aligned driver slots 196 extends longitudinally into the annular wall 188 from the distal end 182.

Figure 9:
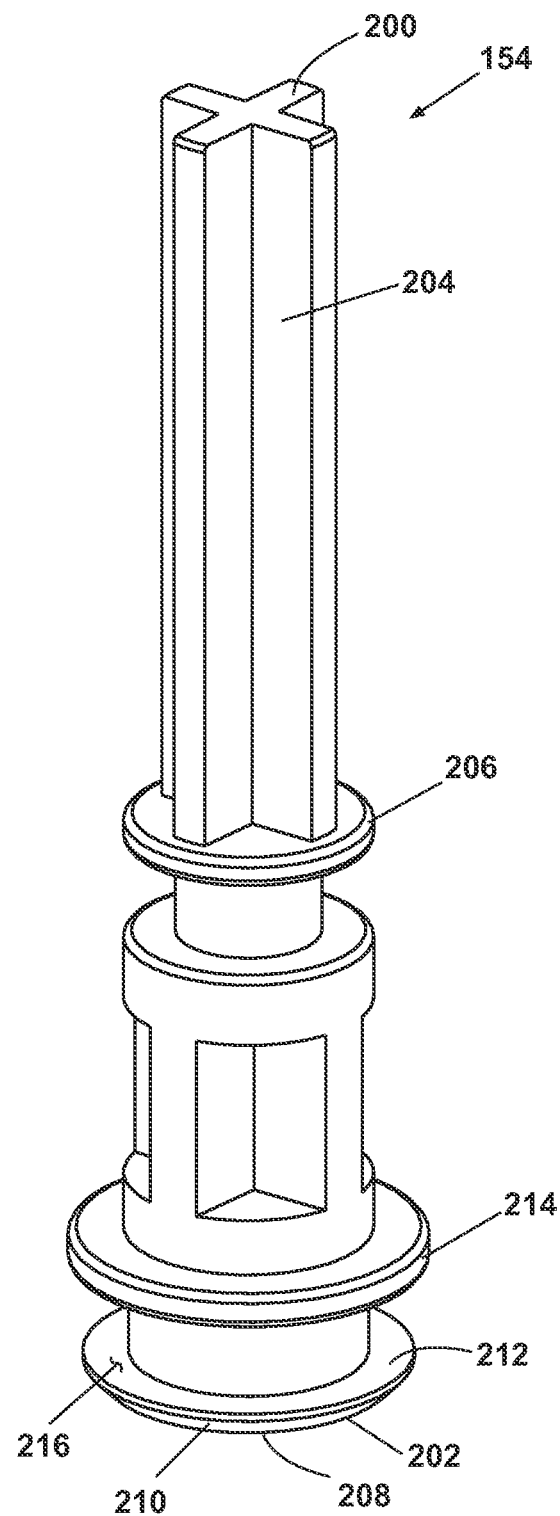
FIG. 9 is a perspective view of a plunger comprising a portion of the valve assembly illustrated in FIG. 1.

Referring to FIG. 9, the plunger valve 154 is an elongated, bilaterally symmetrical member comprising a spring end 200 and a stop end 202. A shaft 204 having a cruciform cross-section extends from the spring end 200 to terminate in a circular, plate-like spring flange 206. The stop end 202 comprises a circular, plate-like end flange 212 having a valve face 208 with a circumscribing beveled edge 210. A circular, plate-like intermediate flange 214 parallel to the end flange 212 defines a circumscribing O-ring channel 216. The shaft 204 is adapted to be received in the plunger chamber 190 with the spring 156 encircling the shaft 204 to bias the plunger valve 154 away from the stop end 202.

Figure 10:
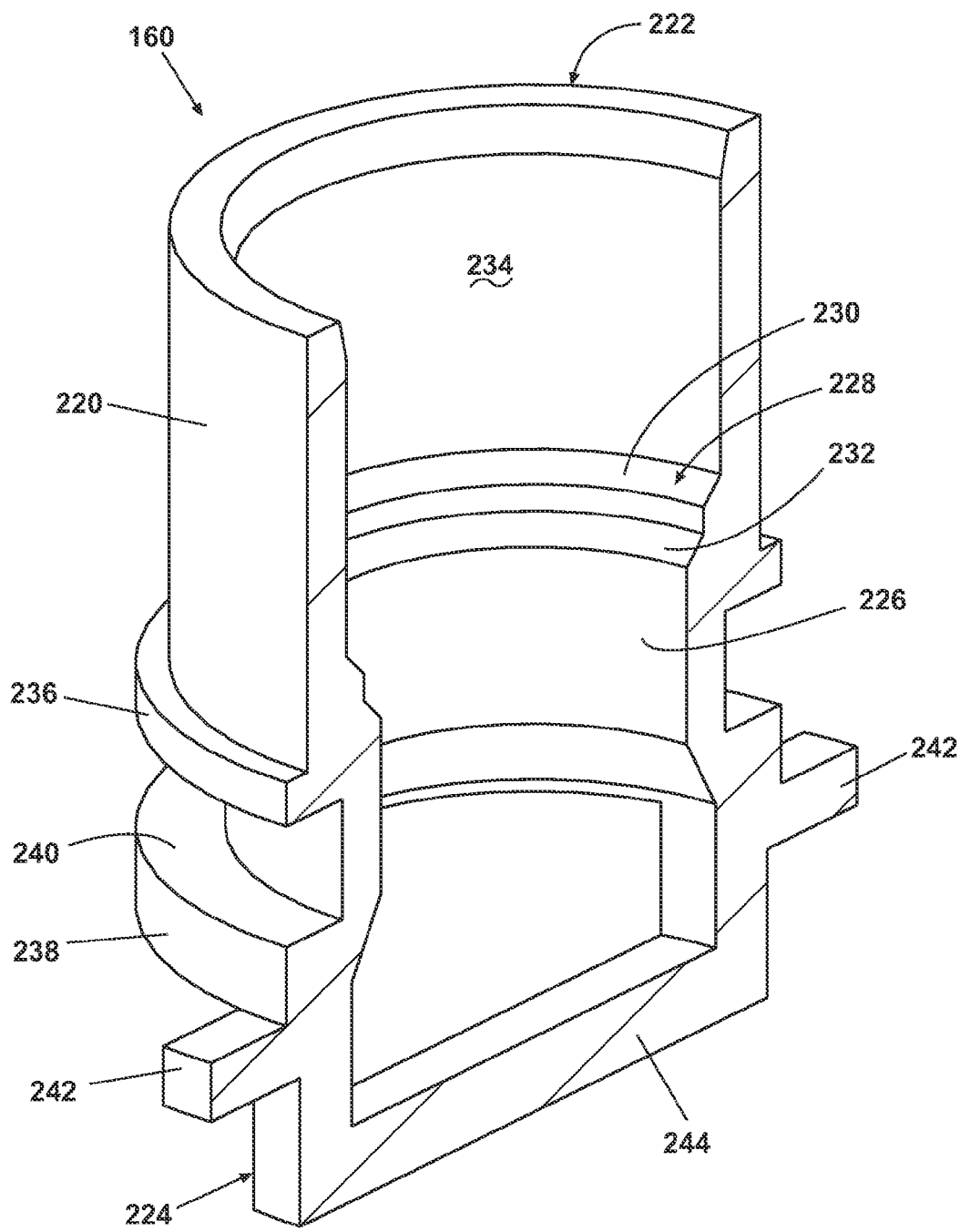
FIG. 10 is a sectional view of a driver comprising a portion of the valve assembly illustrated in FIG. 1.

Referring now to FIG. 10, the driver 160 is a bilaterally symmetrical hollow body comprising a plunger valve end 222 and a disk end 224. The driver 160 comprises an annular wall 220 defining a bore 234 extending coaxially through the driver 160. Intermediate the plunger valve end 222 and the disk end 224 is a radially-inwardly extending boss 226 extending circumferentially about the bore 234. The boss 226 has a serrated inclined face 228 extending radially-inwardly to define an O-ring surface 230 and a beveled edge surface 232. Extending circumferentially about the exterior of the annular wall 220 is an intermediate flange 236. Parallel to, and spaced away from the intermediate flange 236, an end flange 238 extends radially-outwardly of the annular wall 220 to define an O-ring channel 240. A pair of diametrically-opposed, radially-outwardly extending lugs 242 extends away from the annular wall 220 adjacent the end flange 238. The lugs 242 are connected by an elongated disk key 244 extending diametrically across the bore 234 away from the annular wall 220.

Figure 11:
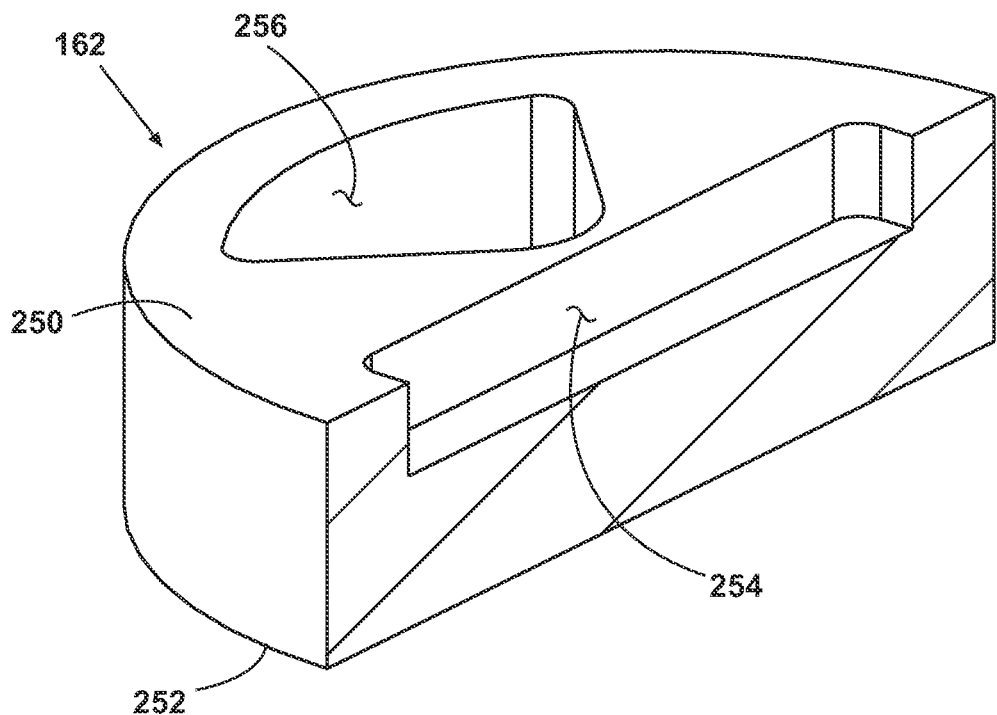
FIG. 11 is a sectional view of a rotating ceramic disc comprising a portion of the valve assembly illustrated in FIG. 1.

Referring now to FIG. 11, the rotating ceramic disk 162 is a generally circular plate-like body comprising a planar drive surface 250 and a parallel, opposed, planar contact surface 252. A diametrically-oriented disk key channelway 254 extends into the rotating disk 162 away from the drive surface 250, and is adapted for keyed registry with the disc key 244. On either side of the disc key channelway 254 is a pair of diametrically-opposed valve openings 256 extending longitudinally through the rotating disc 162. In one embodiment, the rotating disk 162 is fabricated of a ceramic as generally described in U.S. Pat. No. 5,392,805.

Figure 12:
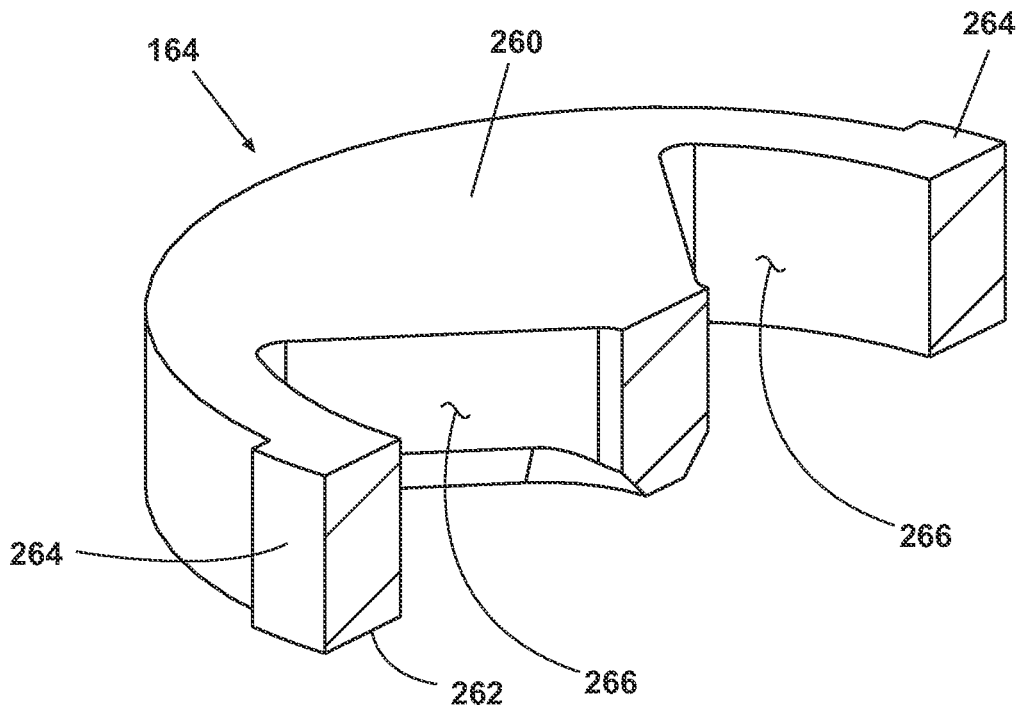
FIG. 12 is a sectional view of a stationary ceramic disc comprising a portion of the valve assembly illustrated in FIG. 1.

Referring to FIG. 12, the stationary disk 164 is a generally circular plate-like body comprising a planar contact surface 260 and a parallel, opposed planar inlet surface 262. A pair of diametrically-opposed lugs 264 projects radially-outwardly away from the circumference of the stationary disk 164. A pair of diametrically-opposed valve openings 266 extends longitudinally through the stationary disk 164. In one embodiment, the valve openings 266 are generally sector-shaped, with the same size and configuration as the valve openings 256 in the rotating disk 162, for cooperative disposition when the rotating disk 162 is suitably aligned with the stationary disk 164. In one embodiment, the stationary disk 164 is fabricated of a ceramic as generally described in U.S. Pat. No. 5,392,805.

Figure 13:
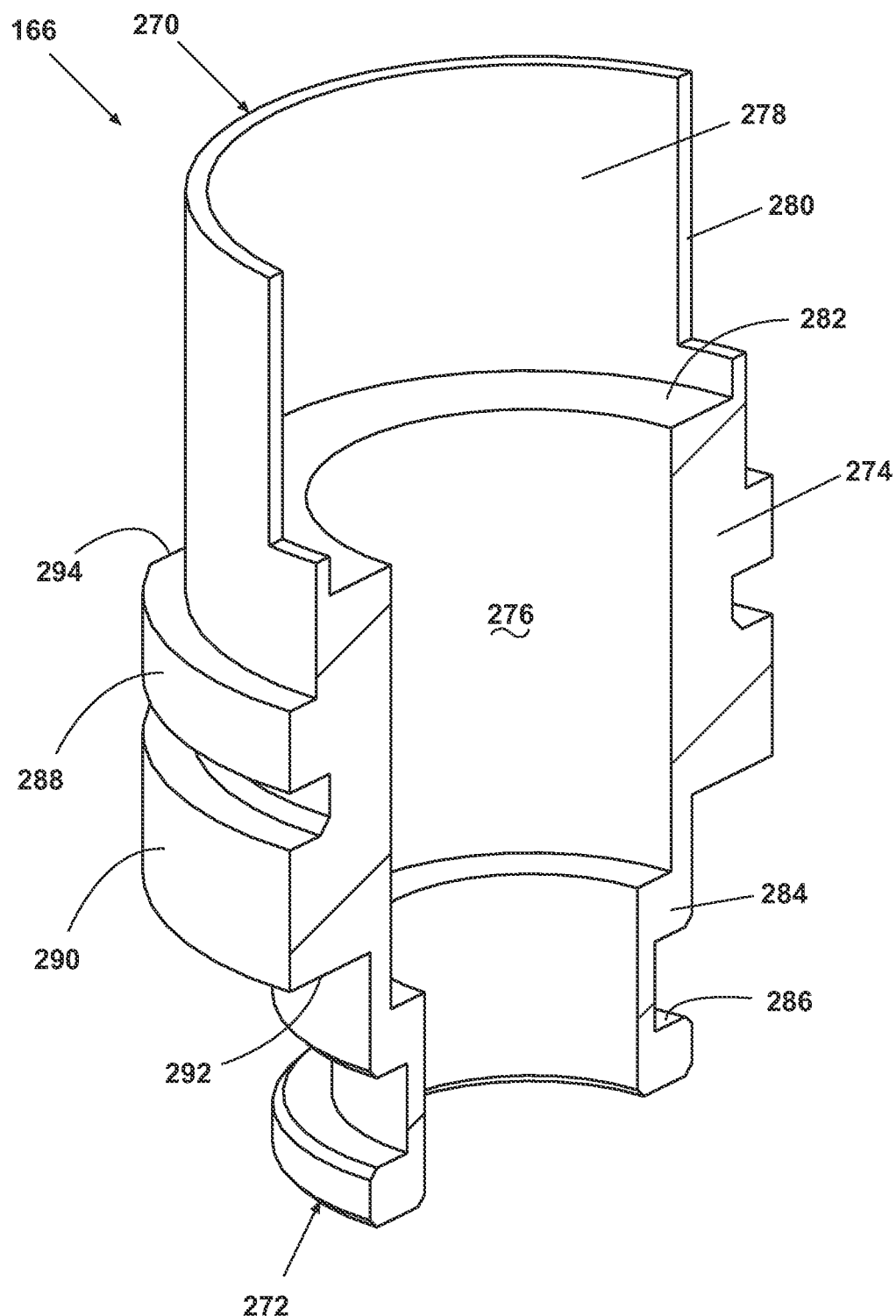
FIG. 13 is a sectional view of a drive adapter comprising a portion of the valve assembly illustrated in FIG. 1.

Referring now to FIG. 13, the drive adapter 166 is a bilaterally symmetrical hollow body comprising a disc end 270 and an inlet end 272. The drive adapter 166 comprises an annular wall 274 defining a bore 276 extending coaxially through the drive adapter 166. The annular wall 274 comprises a relatively thin disk wall portion 278 at the disk end 270, terminating in a radially-inwardly extending planar annular face 282. The disc wall portion 278 is interrupted by a pair of diametrically-opposed, longitudinal slots 280 extending therethrough.

The annular wall 274 terminates at the inlet end 272 in a neck portion 284 having a diameter somewhat less than the diameter of the disc wall portion 278. The neck portion 284 is circumscribed with an O-ring channel 286. Circumscribing the annular wall 274 intermediate the neck portion 284 and the disk wall portion 278 is an intermediate flange 288 extending radially-outwardly from the annular wall 274. Adjacent the intermediate flange 288 and parallel thereto is a bearing flange 290 terminating in a planar annular bearing face 292. A pair of diametrically-opposed, planar chord faces 294 extend longitudinally along and orthogonal to the intermediate flange 288 and the bearing flange 290.

Figure 14:
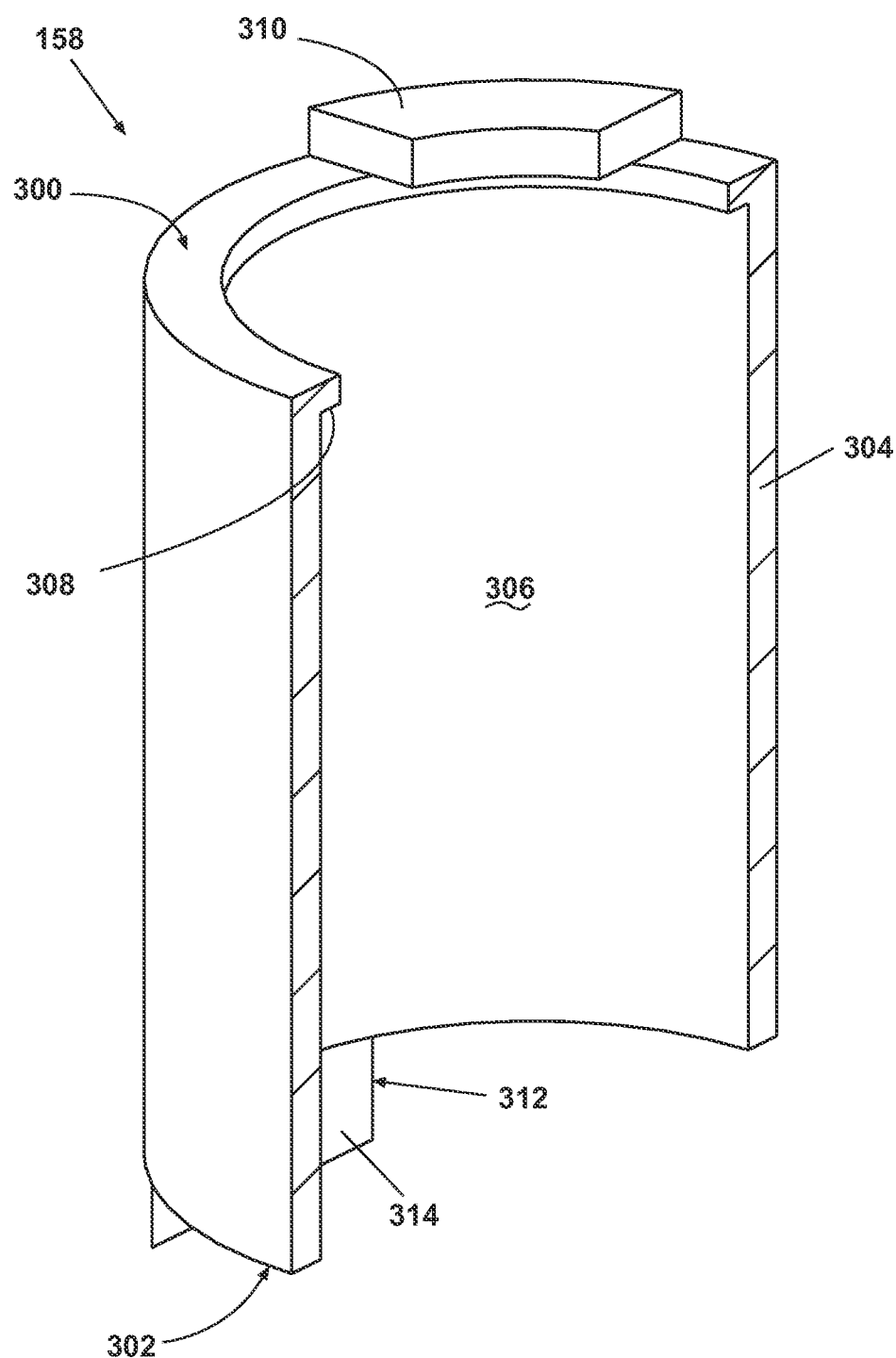
FIG. 14 is a sectional view of a cartridge body comprising a portion of the valve assembly illustrated in FIG. 1.

Referring now to FIG. 14, the cartridge body 158 comprises a bilaterally symmetrical hollow, thin-walled shell comprising a stop end 300 and an adapter end 302. The cartridge body 158 comprises an annular wall 304 defining a bore 306 extending longitudinally through the cartridge body 158. At the stop end 300, the annular wall 304 terminates in a radially-inwardly extending planar annular flange 308. A pair of stops 310 extends radially inwardly from the annular flange 308 to engage a cooperating member, such as a pin or lug (not shown), extending radially away from the circumference of the rotation stem 152 to control the rotation of the rotating disk 162. The stop 310 is illustrated as a somewhat circular sector-shaped member enabling a 90° rotation of the rotating disk 162 relative to the cartridge body 158. Other stop configurations can be utilized to enable a selected degree of rotation of the rotating disk 162 relative to the cartridge body 158, as would be evident to a person of ordinary skill.

Figure 15A:
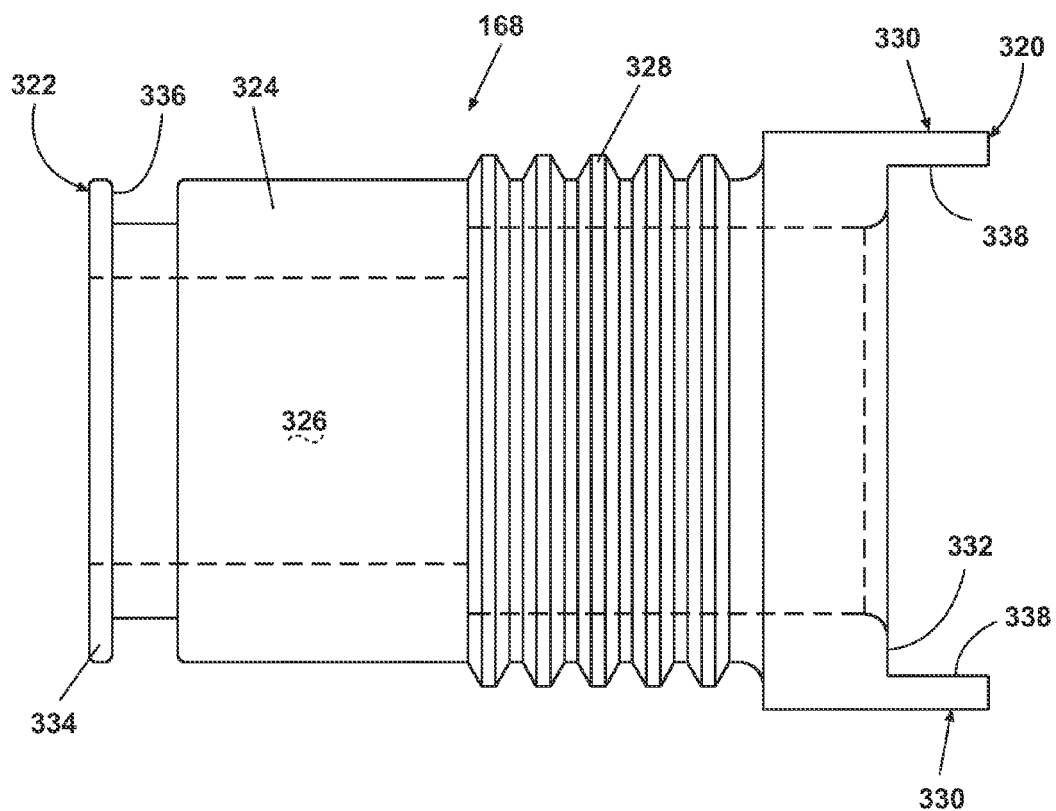
FIG. 15A is a plan view of a first embodiment of a hydrant adapter comprising a portion of the valve assembly illustrated in FIG. 1.
Figure 15B:
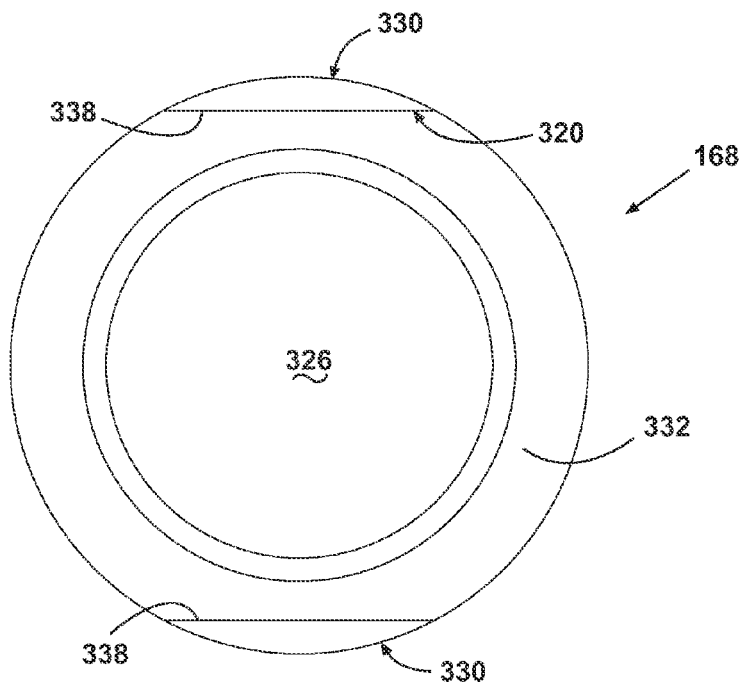
FIG. 15B is an end view of the hydrant adapter illustrated in FIG. 15A.
Figure 17:
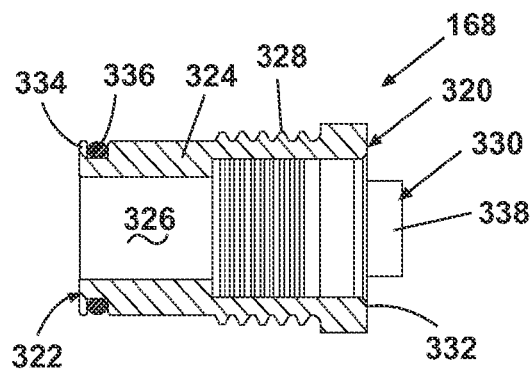
FIG. 17 is a sectional view of the hydrant adapter illustrated in FIGS. 15A and 15B.

Referring now to FIGS. 15A, 15B, and 17, a first embodiment of the hydrant adapter 168 comprises a bilaterally symmetrical hollow body comprising an adapter end 320 and an inlet end 322. An annular wall 324 defines a bore 326 extending coaxially through the hydrant adapter 168. The annular wall 324 is provided with circumscribing external threads 328 extending longitudinally therealong intermediate the adapter end 320 and the inlet end 322. The adapter end 320 terminates in a pair of longitudinally-disposed, diametrically-opposed segment keys 330 having a generally circular segment shape with planar, parallel faces directed diametrically inwardly. The inlet end 322 terminates in an end flange 334 defining an O-ring channel 336 circumscribing the annular wall 324.

Figure 16:
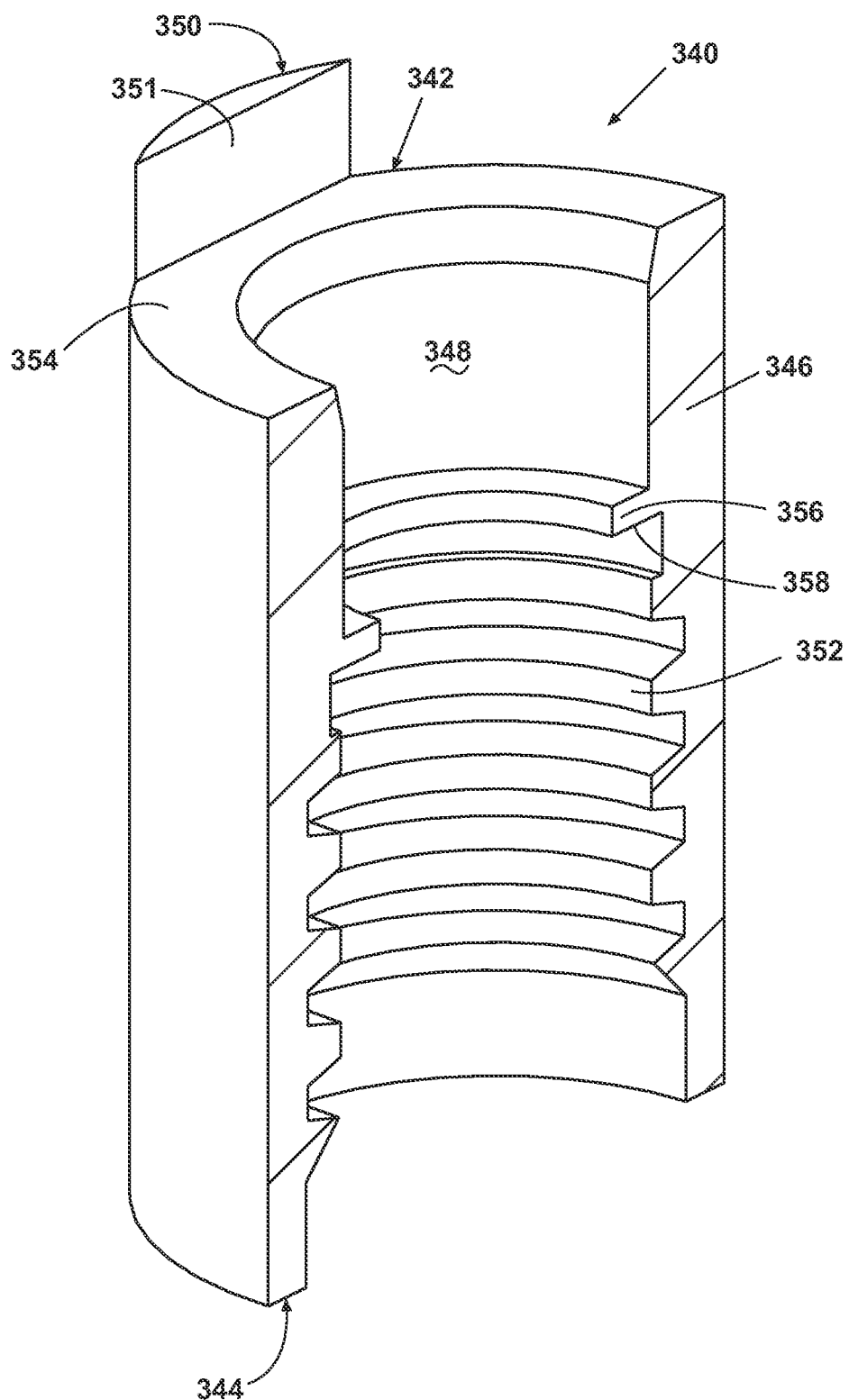
FIG. 16 is a sectional view of a second embodiment of a hydrant adapter comprising a portion of the valve assembly according to the invention.
Figure 18:
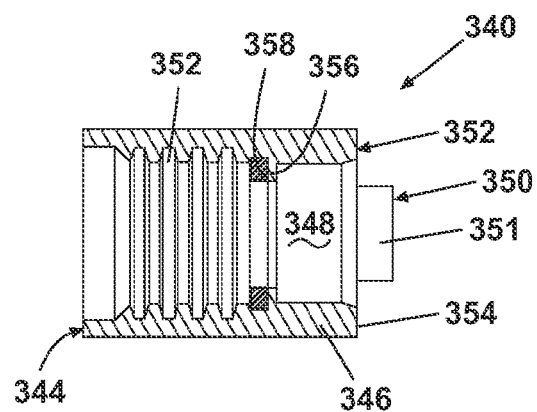
FIG. 18 is a sectional view of the hydrant adapter illustrated in FIG. 16.

FIGS. 16 and 18 illustrate a second embodiment of the hydrant adapter 340 comprising a bilaterally symmetrical hollow body having an adapter end 342 and an inlet end 344. The hydrant adapter 340 comprises an annular wall 346 defining a bore 348 extending coaxially through the adapter 340. A pair of circular segment-shaped segment keys 350 having planar, parallel faces 351 directed diametrically inwardly extend longitudinally away the adapter end 342 in diametrically-opposed juxtaposition. The adapter end 342 terminates in a planar, annular bearing face 354 circumscribing the bore 348.

The bore 348 is circumscribed by interior threads 352 extending longitudinally along the annular wall 346. Adjacent the threads 352 is a circumscribing interior flange 356 extending radially-inwardly from the annular wall 346 and defining an O-ring channel 358 intermediate the interior flange 356 and the interior threads 352.

Figure 19:
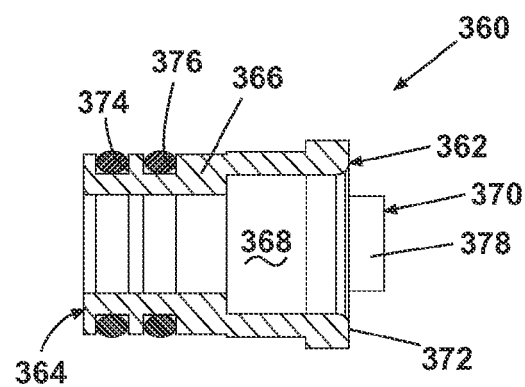
FIG. 19 is a sectional view of a third embodiment of the hydrant adapter comprising a portion of the valve assembly according to the invention.

Referring now to FIG. 19, a third embodiment of the hydrant adapter 360 is illustrated comprising a bilaterally symmetrical hollow body having an adapter end 362 and an inlet end 364. The adapter 360 comprises an annular wall 366 defining a bore 368 extending coaxially through the hydrant adapter 360. The adapter end 362 is provided with a pair of diametrically-opposed segment keys 370, having planar, parallel bearing faces 372 directed diametrically inwardly, extending longitudinally away from a planar, annular bearing face 372. The inlet end 364 is provided with a pair of O-ring channels 374, 376 in parallel, spaced disposition extending circumferentially about the annular wall 366.

Referring again to FIG. 1, the valve assembly 12 is assembled so that the plunger valve 154 and spring 156 are received in the plunger chamber 190 of the rotation stem 152 with the valve face 208 oriented away from the distal end 182 of the rotation stem 152. The driver 160 is coupled with the rotation stem 152 by inserting the plunger valve end 222 into the plunger chamber 190 so that the lugs 242 are received in the driver slots 196. The rotating disk 162 is coupled with the driver 160 by inserting the disk key 244 in the disk key channelway 254. The stationary disk 164 is coupled with the drive adapter 166 by inserting the stationary disk 164 in the bore 276 of the drive adapter 166 so that the lugs 264 of the stationary disk 164 are received in the slots 280 in the disk wall portion 278, and the inlet surface 162 is in contact with the annular face 282. The drive adapter 166 is then aligned with the cartridge body 158 which has received the driver 160, the rotating disk 162, and the distal end 182 of the rotation stem 152, so that the drive adapter 166 is partially received in the cartridge body 158. The cartridge body 158 can be fixed to the drive adapter 166 in a suitable manner, such as by soldering, crimping, a friction fit, and the like.

The drive tube 150 is an elongated, hollow tube, such as a length of copper tubing having a length, diameter, and wall thickness suitable for the purposes described herein. The drive tube 150 is inserted into the tube chamber 186 of the rotation stem 152 and fixedly coupled to the rotation stem 152 in a suitable manner, such as by soldering.

The assembly of the valve assembly 12 is generally as described in U.S. Pat. No. 5,392,805 to ensure that the pressure between the contact surface 252 of the rotating disk 162 and the contact surface 260 of the stationary disk 164 is within a selected range of intensities.

The assembly can be installed in a hydrant 10 by first selecting the appropriate hydrant adapter 168, 340, 360. Using the drive adapter 166 as an example, the hydrant adapter 168 is coupled with the drive adapter 166 by inserting the neck portion 284 into the bore 326 so that the planar faces 338 of the segment keys 330 are in registry with the chord faces 294 of the annular wall portion 278 of the drive adapter 166. Thus, rotation of the drive adapter 166 will urge the rotation of the hydrant adapter 168. An O-ring installed in the O-ring channel 286 of the drive adapter 166 will assist in coupling the hydrant adapter 168 with the drive adapter 166, and will also seal the joint between the drive adapter 166 and the hydrant adapter 168 against the migration of water therethrough.

With the drive adapter 166 coupled to the hydrant adapter 168, the assembly can be inserted through the faucet bore 22 and the body tube 16 for threadably coupling the hydrant adapter 168 with the water supply fixture 18. Installation of an O-ring in the O-ring channel 336 of the hydrant adapter 168 will seal the hydrant adapter 168 to the water supply fixture 18, and prevent migration of water through the joint. Once the hydrant adapter 168 is threadably installed to the water supply fixture 18, the valve assembly can be separated from the hydrant adapter 168 by pulling the assembly axially away from the hydrant adapter 168 using the drive tube 150.

With the hydrant adapter 168 installed, the drive tube 150 can be cut to an appropriate length for completion of the assembly and operation of the hydrant 10. In an embodiment of the invention, the drive tube 150 extends approximately ½" beyond the end of the faucet body 20. An O-ring 32 is installed in the O-ring channel 74 of the stem seal 28, which is threadably coupled with the faucet body 20. The drive tube 150 will extend through the bore 68 of the stem seal 28, with the O-ring 32 in registry with the drive tube 150. The drive tube stop 34 is then coupled with the stem seal 28 so that the flange surface 94 of the drive tube stop 34 is in contact with the internal stop 82 of the stem seal 28. The lock nut 36 is then coupled with the stem seal 28 to retain the drive tube stop 34 against the stem seal 28, while enabling the drive tube stop 34 to rotate relative to the stem seal 28.

The ferrule 44 is then installed over the drive tube 150 so that the second beveled wall 126 engages the beveled wall 100 of the drive tube stop 34. The ferrule nut 46 is then coupled with the drive tube stop 34 and can then rotate with the rotation of the drive tube stop 34. Tightening of the ferrule nut 46 to the drive tube stop 34 will bring the beveled wall 146 of the ferrule nut 46 into registry with the first beveled wall 124 of the ferrule 44, thereby compressing the ferrule 44 against the drive tube 150 to create a known compression fitting. Finally, the knob 50 is attached to the ferrule nut 46 through the knob screw 48. Turning of the knob 50 will turn the ferrule nut 46, the drive tube stop 34, and the drive tube 150. This, in turn, will operate the valve assembly 12 to control the flow of water between a fully off and a fully on position.

The hydrant assembly can be generally fabricated of a material suitable for the purposes described herein, such as brass or other materials known by those of ordinary skill as commonly used in plumbing applications. O-rings can be fabricated of a suitable natural or synthetic rubber. Washers can be fabricated of nylon or similar materials providing a low friction bearing surface.

Subsequent repairs to the hydrant assembly can be readily completed by removing the knob 50, the ferrule nut 46, the lock nut 36, and the stem seal 28, and removing the valve assembly 12 by pulling the assembly out of the body tube 16. The process is reversed to reinstall the assembly to the hydrant 10. The assembly can be readily incorporated into different hydrants simply by selecting a suitable hydrant adapter 168, 340, 360. A hydrant adapter can be fabricated for any hydrant, thus enabling the valve assembly to be retrofitted in any hydrant. The three embodiments of hydrant adapters 168, 340, 360 correspond to most known compression hydrants now in commerce. It is within the scope of the invention to provide any hydrant adapter to retrofit to an existing water supply, and thereby enable the present hydrant assembly to replace any existing hydrant assembly.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A retrofit kit for a frost resistant hydrant of the type connected to a water supply fixture and comprising a spout assembly, a body tube, a valve assembly, and a stem of an appropriate length extending between the spout assembly and the valve assembly within the body tube to actuate the valve assembly, the retrofit kit comprising a valve assembly and a stem having a length greater than the appropriate length, wherein the valve assembly is configured to couple to water supply fixture by way of a hydrant adapter, and wherein the stem can be cut to the appropriate length for operably coupling the valve assembly to the spout assembly within the body tube whereby the retrofit kit can be adapted to existing body tubes of different appropriate lengths to complete a retrofitted frost resistant hydrant regardless of the appropriate length.

2. The retrofit kit according to claim 1 wherein the valve assembly comprises a ceramic valve cartridge.

3. The retrofit kit according to claim 1 wherein the stem comprises a drive tube.

4. The retrofit kit according to claim 1 wherein the hydrant adapter comprises a threaded connection to the water supply fixture.

5. The retrofit kit according to claim 4 wherein the hydrant adapter comprises an externally threaded connection to the water supply fixture.

6. The retrofit kit according to claim 4 wherein the hydrant adapter comprises an internally threaded connection to the water supply fixture.

7. The retrofit kit according to claim 1 wherein the hydrant adapter comprises a press fit connection to the water supply fixture.

8. A method of replacing a valve assembly in an existing frost free hydrant of the type comprising a spout assembly, a body tube connected between the spout assembly and a water supply fixture, a valve assembly within the body tube and engaged with the water supply fixture, and a stem of an appropriate length extending between the spout assembly and the valve assembly within the body tube to actuate the valve assembly, the method comprising:

removing the spout assembly, the stem, and the valve assembly from the body tube;

providing a retrofit kit comprising a replacement valve assembly and a replacement stem having a length greater than the appropriate length;

cutting the replacement stem to the appropriate length;

inserting the replacement valve assembly and replacement stem into the body tube;

coupling the replacement valve assembly to an existing water supply fixture by way of a hydrant adapter;

coupling the replacement stem to the spout assembly; and reconnecting the spout assembly to the body tube.

9. The method of claim 8 wherein the replacement stem is a drive tube.

10. The method of claim 8 wherein the appropriate length is measured on the replacement stem while the replacement valve assembly and replacement stem are in the body tube.

11. The method of claim 10 wherein the appropriate length is determined to be ½ inch beyond the end of the body tube.

* * * * *

UNITED STATES PATENT AND TRADEMARK OFFICE
CERTIFICATE OF CORRECTION

| | | |
|---|---|---|
| PATENT NO. | : 8,490,638 B2 | Page 1 of 1 |
| APPLICATION NO. | : 13/194106 | |
| DATED | : July 23, 2013 | |
| INVENTOR(S) | : Patrick Fitzpatrick | |

It is certified that error appears in the above-identified patent and that said Letters Patent is hereby corrected as shown below:

In the CLAIMS:

Column 8, Claim 1, Line 53, reads: "...wherein the valve assembly is configured to couple to water supply fixture..."

It should read: "...wherein the valve assembly is configured to couple to a water supply fixture..."

Signed and Sealed this
Seventeenth Day of September, 2013

Teresa Stanek Rea
*Deputy Director of the United States Patent and Trademark Office*